US012626434B2

(12) United States Patent
Iglesias Navarro et al.

(10) Patent No.: US 12,626,434 B2
(45) Date of Patent: May 12, 2026

(54) FACIAL IMAGE SWAPPING

(71) Applicant: DISNEY ENTERPRISES, INC., Burbank, CA (US)

(72) Inventors: Santiago Iglesias Navarro, Palma de Mallorca (ES); Pablo Pernías Pascual de Pobil, San Juan de Alicante (ES); Robert B. Moore, Clermont, FL (US); David N. Juboor, Johnson City, TN (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 83 days.

(21) Appl. No.: 18/425,566

(22) Filed: Jan. 29, 2024

(65) Prior Publication Data

US 2025/0245884 A1 Jul. 31, 2025

(51) Int. Cl.
*G06T 11/60* (2006.01)
*G06N 20/00* (2019.01)

(52) U.S. Cl.
CPC .............. *G06T 11/60* (2013.01); *G06N 20/00* (2019.01)

(58) Field of Classification Search
CPC ........ G06T 11/60; G06T 11/00; G06T 11/001; G06T 11/80; G06T 15/04; G06T 5/60; G06T 2207/20084; G06F 30/27; G06N 3/02; G06N 20/00
See application file for complete search history.

(56) References Cited

U.S. PATENT DOCUMENTS

| | | | |
|---|---|---|---|
| 11,610,351 B2 | 3/2023 | Bethge et al. | |
| 12,159,334 B2 * | 12/2024 | Kuta | G06F 21/6254 |
| 12,340,440 B2 | 6/2025 | Chandran et al. | |
| 12,345,806 B2 * | 7/2025 | Lyu | G01S 7/40 |
| 2020/0134150 A1 * | 4/2020 | Hunegnaw | G06N 20/00 |
| 2021/0358164 A1 | 11/2021 | Liu et al. | |
| 2022/0004921 A1 | 1/2022 | Balaraman et al. | |
| 2022/0156987 A1 | 5/2022 | Chandran et al. | |
| 2024/0354895 A1 | 10/2024 | Ravi et al. | |
| 2025/0078349 A1 | 3/2025 | Cho et al. | |
| 2025/0111573 A1 * | 4/2025 | Phan | G06T 19/20 |

(Continued)

OTHER PUBLICATIONS

Gatys, et al., "A Neural Algorithm of Artistic Style.", Sep. 2, 2015 Journal of Vision 2016; 16(12):326. https://doi.org/10.1167/16.12.326.

(Continued)

*Primary Examiner* — Vijay Shankar
(74) *Attorney, Agent, or Firm* — Dorsey & Whitney LLP

(57) ABSTRACT

Techniques for generating modified images using facial content information are disclosed. First image data comprising first facial content information is received, and a facial content encoder generates a first embedding by extracting the first facial content information from the first image data. Second image data comprising second facial content information and non-facial content information (e.g., style information, pose, facial expression) is received, and a non-facial content encoder generates a second embedding comprising the non-facial content information. A decoder generates a modified image using the first embedding and the second embedding, the modified image comprising the first facial content information of the first image data and the non-facial content information of the second image data.

20 Claims, 4 Drawing Sheets

(56) References Cited

U.S. PATENT DOCUMENTS

| | | | |
|---|---|---|---|
| 2025/0245878 A1 | 7/2025 | Pernias Pascual De Pobil et al. |
| 2025/0342565 A1 | 11/2025 | Ortiz et al. |
| 2025/0342567 A1 | 11/2025 | Ortiz et al. |
| 2025/0342620 A1 | 11/2025 | Ortiz et al. |

OTHER PUBLICATIONS

Gatys, et al., "Controlling Perceptual Factors in Neural Style Transfer", 2017 IEEE Conference on Computer Vision and Pattern Recognition (CVPR), Honolulu, HI, USA, 2017, pp. 3730-3738, doi: 10.1109/CVPR.2017.397.

Gatys, et al., "Image style transfer using convolutional neural networks", Proceedings of the IEEE conference on computer vision and pattern recognition. 2016. pp. 2414-2423. doi: 10.1109/CVPR.2016.265.

* cited by examiner

FACIAL IMAGE SWAPPING

CROSS REFERENCE TO RELATED APPLICATION

This application is related to the Applicant's concurrently filed application titled "Image Style Transfer," which is incorporated herein by reference in its entirety for all purposes.

FIELD

Described embodiments relate generally to generating modified images, such as modifying facial information in an image.

BACKGROUND

Digital images can be modified in various ways to generate modified images. For example, images can be digitally manipulated to add or remove content or to replace a person's likeness with that of a different person. Modified images can also be generated to combine characteristics or content of images. Image manipulations can be applied manually or using various algorithms. Current techniques may have only limited functionality to transfer selected information, e.g., facial information, or combine information from different images in a fast and accurate manner.

SUMMARY

The following Summary is for illustrative purposes only and does not limit the scope of the technology disclosed in this document.

In an embodiment, a computer-implemented method of generating modified images using facial content is disclosed. First image data is received including first facial content information. The first facial content information can include shapes or dimensions of a set of facial features in the first image data. A first embedding (e.g., a facial content embedding) is generated using a facial content encoder, the embedding including the first facial content information. To generate the embedding, the facial content encoder extracts the first facial content information from the first image data. Second image data is received including second facial content information and non-facial content information. The non-facial content information can include style information, a pose or facial expression of the second facial content information, background information (e.g., background content or style), color information, texture information, or the like. The style information can include an artistic style, an animation style, or the like. A second embedding (e.g., a non-facial content embedding) is generated using a non-facial content encoder, the second embedding including the non-facial content information. A modified image is generated by a decoder using the first embedding and the second embedding, the modified image including the first facial content information of the first image data and the non-facial content information of the second image data.

In various embodiments, the facial content encoder, the non-facial content encoder, and the decoder are included in a machine-learned ("ML") model. In these and other embodiments, the method further includes receiving a plurality of image data including a plurality of facial content information and a plurality of non-facial content information, generating a training dataset using the received plurality of image data, the received plurality of image data being pre-processed by cropping and aligning the plurality of facial content information, and training the ML model using the generated training dataset, the training including determining a set of loss functions and corresponding weights based on the loss functions. In various embodiments, the method further includes evaluating accuracy of the ML model using a testing dataset comprising at least a portion of the training dataset, and retraining the ML model when the accuracy does not exceed a threshold accuracy, the retraining including adjusting a set of weights or training the ML model using a different training dataset.

In another embodiment, a system is disclosed including one or more processors and one or more memories carrying instructions configured to cause the one or more processors to perform the foregoing methods.

In yet another embodiment, a computer-readable medium is disclosed carrying instructions configured to cause one or more computing systems or one or more processors to perform the foregoing methods.

DETAILED DESCRIPTION

Figure 1:
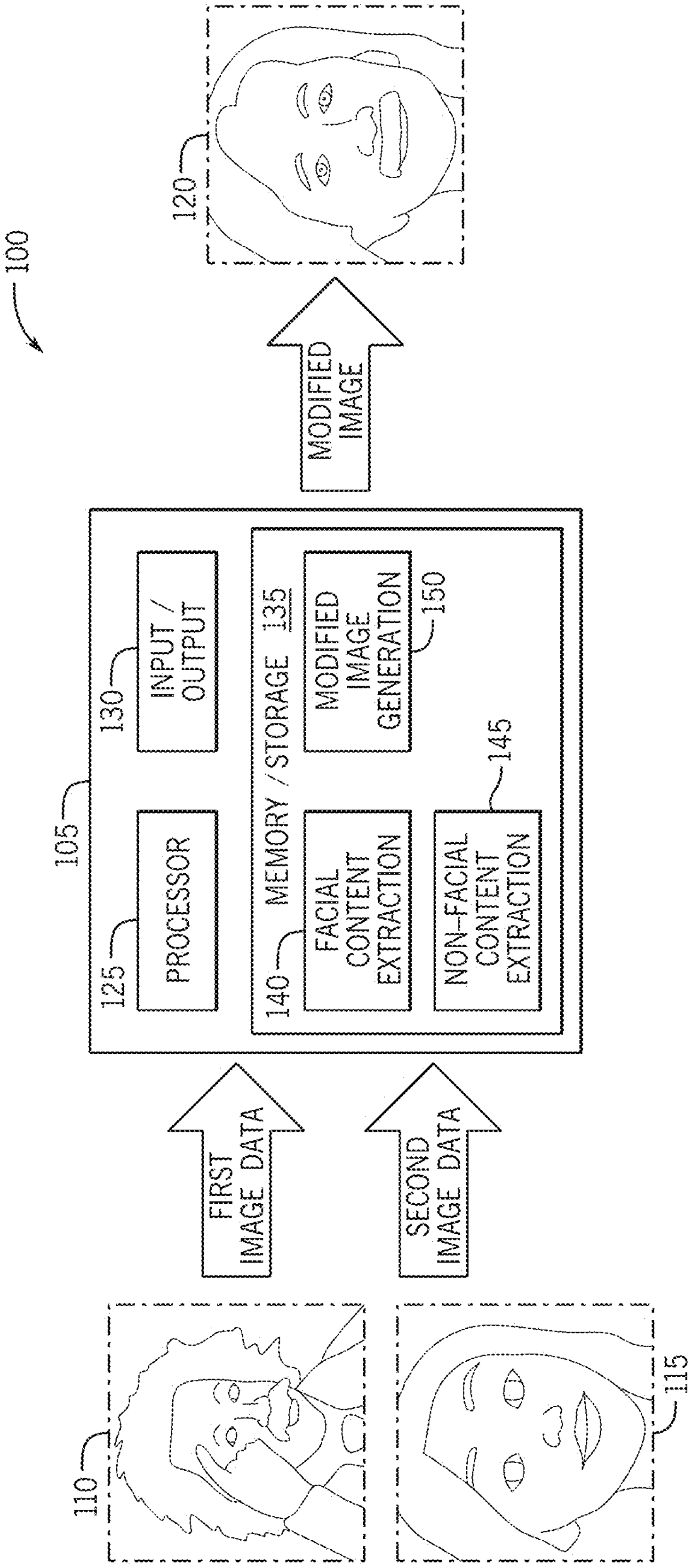
FIG. 1 is a block diagram illustrating a system flow for image content swapping.

Conventional techniques to modify images may use manual processes or simple algorithms that may provide limited functionality to transfer content or style information between images. For example, while conventional techniques may allow facial content of a first image to be modified using facial content of a second image, such techniques are typically inefficient or do not provide satisfactory results, e.g., many are done by "cut and paste" techniques manually selected by a user. Conventional techniques may also require many different instances of images to be functional (e.g., to train a model), such as variations of the same image. For example, conventional techniques may require extensive and varied training data to be able to satisfactorily retain identifying facial characteristics of a source image to incorporate a face from the source image into a destination image. Such techniques do not allow fast rendering, blending, and easy changes between different changed features and the like.

Various embodiments described herein include a method to perform facial image swapping using a ML model. The system swaps selected content features, e.g., facial information, between different images, such as for adding a face from a source image to a destination image. For example, first facial content from a first image can be extracted and swapped for second facial content of a second image. The system can add facial content of a source image to a single destination image without requiring multiple examples or variations of either the source image or the destination image. As used herein, facial content refers to features of a face (e.g., a human face) included or represented in an image and can include the size and/or shape of facial features (e.g., eyes, nose, mouth, eyebrows, face shape). That is, facial content refers to features or characteristics of a face that allow the face to be identified as belonging to a specific person without regard to facial expression, facial pose, orientation, image style, background information, and so forth. As used herein, non-facial content refers to content and other image characteristics separate from facial content and includes objects or shapes outside of a face (e.g., background) as well as image characteristics separate from content, such as color, texture, animation characteristics, facial pose, facial expression, background, or the like.

One or more ML models extract characteristics from image data and generate modified images. An ML model includes an identity or facial content encoder, a non-facial content encoder (e.g., style encoder), and a decoder that extract image characteristics and combine the extracted image characteristics to generate modified images using the extracted characteristics. A ML model can comprise a neural network, such as a general adversarial network ("GAN"). For example, a facial content encoder is trained to extract facial content information from image data, and a non-facial content encoder is trained to extract non-facial content information from image data. The facial content information and the non-facial content information is then used to generate respective embeddings (e.g., vector representations), which can be combined (e.g., using a decoder) to generate modified images. As used herein, an encoder refers to at least a portion of a ML model configured to receive an input (e.g., image data) and generate a latent representation of the input. The latent representation can include an embedding, which is a set of one or more coordinates in a n-dimensional space (e.g., a vector). An embedding refers to a representation of data as points or coordinates in a dimensional space where respective locations are semantically meaningful. As used herein, a decoder refers to at least a portion of a ML model configured to receive the latent representations generated by the encoders and generate an output (e.g., reconstructed or modified image data).

Utilizing the ML model and architecture, images with content included from different images can be efficiently and accurately generated, e.g., to swap or place a face from a first image (or source image) onto a subject from a second image (or destination image). The system may enable the content being merged or swapped into another to be preserved, but also blended with the new image. For example, when adding a face from a first image into a second image, the face may be modified to match the coloring, textures, facial expression or pose, background, and other attributes of the second image, but keep the main identifying facial characteristics that are unique or otherwise attributed to the face. In other words, the identity of the face from the source image is preserved when the face is integrated into the destination image. In this manner, the modified image will look "original" in that the style (e.g., colors, textures, artistic or animation style, etc.) match and are generally uniform, but with the content and recognizable aspects of the first image, e.g., the face. In various embodiments, an ML model can be trained and applied without normalization of inputs (e.g., image data), and the disclosed technology instead relies on residuality and a proper weight initialization for stability.

Although examples described herein relate to swapping facial content, various embodiments can additionally or alternatively swap other image content. For example, other body parts, accessories, or clothes can be swapped. Additionally or alternatively, objects can be swapped. Various embodiments can be used to swap one character for another character in an animation, to swap an animated character for an actor, to replace a placeholder object with an image of a different object (e.g., from a photo, a film, or an animation), and so forth.

FIG. 1 is a block diagram illustrating a system flow 100 for image content swapping. The system flow 100 utilizes a content swapping system 105 to receive first image data 110 of a first image (e.g., a source image) comprising extracted content and second image data 115 comprising different content (e.g., a destination image). The system 105 processes the first image data 110 and the second image data 115 to generate a modified image 120, including the extracted content from the first image data 110 swapped with the different content from the second image data 115. In other words, the different content is replaced with the extracted content, such that the modified image 120 comprises characteristics and/or content of the second image data 115 combined with the extracted content from the first image data 110. The extracted content can be facial information. That is, identifying information of a face in the source image represented by the first image data 110 is extracted and seamlessly incorporated into the destination image in the second image data 115 to generate the modified image 120, while retaining the characteristics of the destination image, such as style, color, texture, facial pose, facial expression, and so forth.

The system 105 includes at least one processor 125, which can be a central processing unit (CPU), a graphics processing unit (GPU), and/or one or more hardware or virtual processing units or portions thereof (e.g., one or more processor cores). The at least one processor 125 can be used to perform calculations and/or execute instructions to perform operations of the system 105, e.g., train and execute a ML model. The system 105 further comprises one or more input/output components 130. The input/output components 130 can include, for example, a display to provide one or more interfaces provided by the system 105, to display data, such as first image data 110, second image data 115, and modified images 120. Additionally or alternatively, input/output components 130 can include various components for receiving inputs, such as a mouse, a keyboard, a touchscreen, a biometric sensor, a wearable device, a device for receiving gesture-based or voice inputs, and so forth. In an example implementation, the input/output components 130 are used to provide one or more interfaces for displaying modified images 120 and receiving first image data 110 and second image data 115.

One or more memory and/or storage components 135 are included in the system 105, which can store and/or access modules of the system 105, the modules including at least a facial content extraction module 140, a non-facial content extraction module 145, and/or a modified image generation module 150. The memory and/or storage components 135 can include, for example, a hardware and/or virtual memory, and the memory and/or storage components 135 can include non-transitory computer-readable media carrying instructions to perform operations of the system 105 described herein.

The facial content extraction module 140 can comprise pre-processing logic and at least a portion of a ML model (e.g., a facial content encoder) configured to receive the first image data 110 and extract facial content information from the first image data 110. For example, the facial content extraction module 140 can pre-process the first image data 110 to identify one or more features present in the first image data 110, such as facial features, and the content extraction module 140 can generate a first embedding based on the pre-processed first image data 110. The first embedding represents facial content in the first image data 110, such as shapes and other identifying characteristics of facial features in the first image data 110. In an example implementation, the first embedding generated using the first image data 110 can represent dimensions of facial features, while the first embedding omits superfluous information, such as color or texture information of the first image data 110. The facial content extraction module 140 can use various techniques to extract facial content information, such as image segmentation or edge detection to partition an image into parts or regions based on pixel characteristics. The facial content extraction module 140 can include a model trained using an ArcFace technique, which is configured to compare face similarity or extract identifying features of a face. In some implementations, a "freezed" model is used.

The non-facial content extraction module 145 can comprise pre-processing logic and at least a portion of a ML model (e.g., a style encoder and/or a non-facial content encoder) configured to receive the second image data 115 and extract non-facial content information from the second image data 115. For example, the non-facial content extraction module 145 can pre-process the second image data 115 to identify one or more features present in the second image data 115, such as image content outside of a face, color information, texture information, face pose, facial expression, or backgrounds, and the non-facial content extraction module 145 can generate a second embedding based on the pre-processed second image data 115. The second embedding represents features of the second image data 115, such as the non-facial content (e.g., background, pose, facial expression) and the identified color information and texture information. In an example implementation, the second embedding generated using the second image data 115 can represent non-facial content information, color information, texture information, or other characteristics of the second image data 115, while the second embedding omits superfluous information, such as facial content information of the second image data 115. In some implementations, the non-facial content extraction module 145 includes a non-facial content encoder that is trained along with a decoder as a whole model. The non-facial content encoder is trained to compress an image into an embedding that can be used to reconstruct (e.g., using the decoder) all portions of an image other than a face identity. In other words, through the training of the whole model, the non-facial content encoder learns to generate an embedding that retains the information necessary to generate non-facial portions of an image, and this embedding can be combined with a facial embedding (e.g., received from the facial content extraction module 140) to generate an image. The whole model can be an autoencoder configured or trained to encode an input image into a compressed and meaningful representation, and then decode it back such that the reconstructed image is as similar as possible to the original one.

The modified image generation module 150 receives the first embedding generated by the facial content extraction module 140 and the second embedding generated by the non-facial content extraction module, and the modified image generation module 150 generates a modified image 120. For example, the modified image generation module 150 includes at least a portion of a ML model (e.g., a decoder) configured to perform concatenation to generate the modified image 120 using the first embedding and the second embedding. The modified image generation module 150 can include a decoder portion of a whole model that is trained as described above with reference to the non-facial content extraction module 145. Training the decoder or the whole model can include determining or configuring (e.g., optimizing) one or more loss functions, which is further discussed below with reference to FIG. 2.

Advantageously, the modified image 120 generated by the modified image generation module 150 retains the facial content (e.g., facial identifying information) of the first image data 110 while discarding superfluous information in the first image data 110, such as color or texture information, and it retains the non-facial content of the second image data 115 while discarding superfluous information in the second image data 115. The resulting modified image 120 seamlessly incorporates identifying characteristics of the face from the first image data 110 into the second image data 115 while retaining characteristics of the second image data 115, such as pose, facial expression, color, style, texture, background/background content, and so forth.

Modules of the system 105 can use various ML models, and a specific example of a model is described with reference to FIG. 2 below. As used herein, a "model" or "ML model" can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models and/or associated techniques include, without limitation: neural networks, support vector machines, decision trees, Parzen windows, Bayes, clustering, reinforcement learning, probability distributions, decision trees, decision tree forests, and others. Models can be configured for various situations, data types, sources, and output formats. A model trained by the system 105 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to extract image features and/or generate modified images using embeddings. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A model can be trained with supervised learning (e.g., self-supervised). Testing data can then be provided to the model to assess accuracy. Testing data can be, for example, a portion of the entire dataset (e.g., 10%) held back to use for evaluation of the model. Output from the model can be compared to the desired or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new data.

Figure 2:
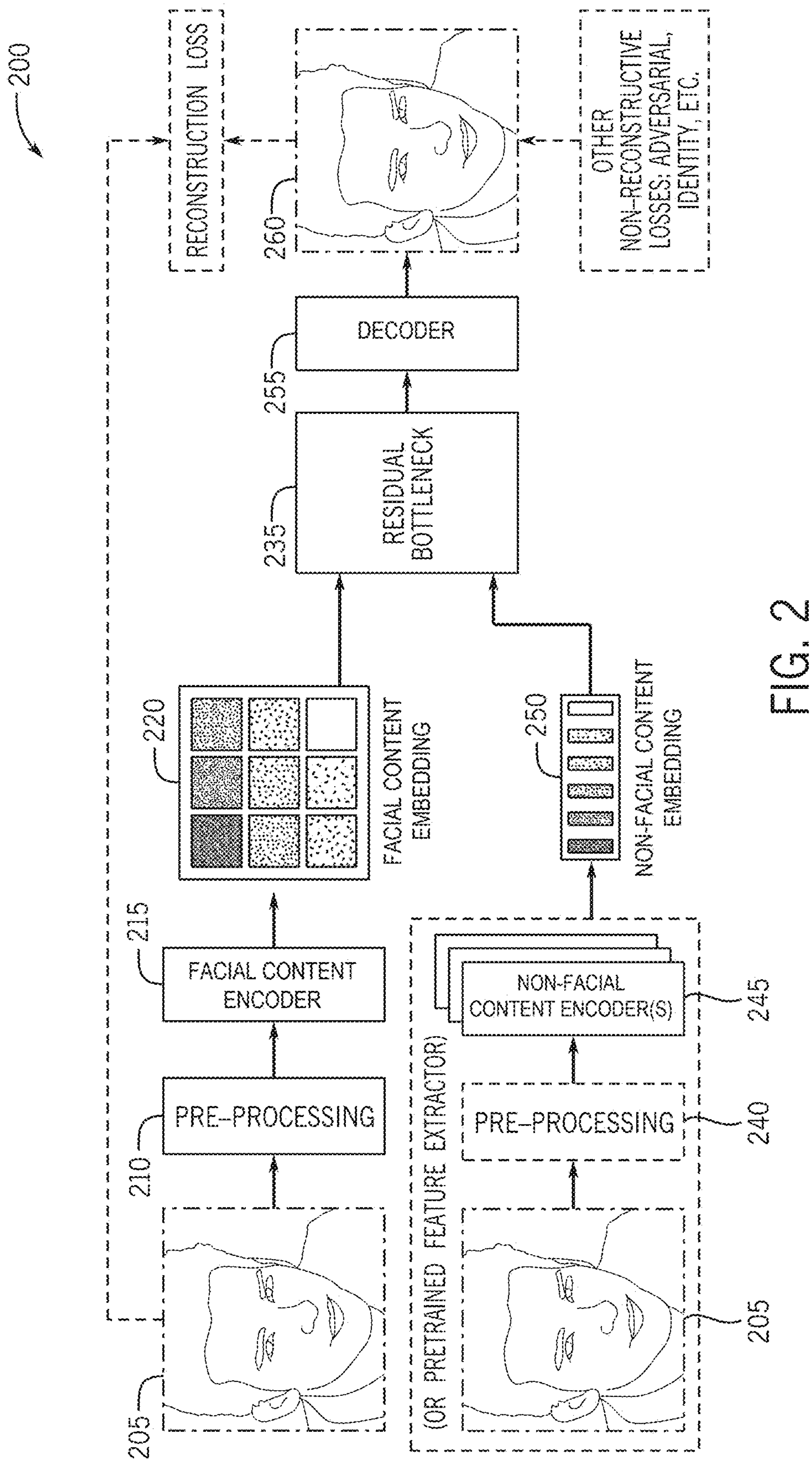
FIG. 2 is a block diagram illustrating a system flow for training a machine-learned model for facial image swapping.

FIG. 2 is a block diagram illustrating a system flow 200 for training a ML model for facial image swapping. The system flow 200 can be used to train a ML model that includes a facial content encoder 215 (e.g., 140 of FIG. 1), a non-facial content encoder 245 (e.g., 145 of FIG. 1), and a decoder 255 (e.g., 150 of FIG. 1). In some implementations, the facial content encoder 215, the non-facial content encoder 245, and the decoder 255 are each separate ML models.

The system flow 200 begins when image data 205 is received. The image data 205 comprises reference images for training the models. The image data 205 includes facial content information (e.g., identifying information of a face) and non-facial content information (e.g., style information, content other than a face, pose, facial expression, background/background content).

In a first branch of the system flow 200 for training the facial content encoder 215, the image data 205 is pre-processed at a block 210. Pre-processing the image data can comprise modifying the image in various ways, such as by cropping the image to retain only relevant content (e.g., a face), discarding superfluous data (e.g., color and texture data, non-facial content), identifying content (e.g., facial features), and so forth. The pre-processed data is then received by the facial content encoder 215, and the facial content encoder 215 generates an embedding 220. The embedding 220 represents the facial content present in the image data 205, such as identifying information of a face. In the depicted example, the embedding 220 can comprise information regarding the facial content of the image data 205 (e.g., shapes and/or dimensions of facial features, etc.), but the embedding does not retain information about colors in the image data 205, textures in the image data 205, non-facial content in the image data 205 (e.g., background), facial expression, face pose, or the like. The embedding 220 is provided to a residual bottleneck 235 for further processing. The facial content encoder 215 can include a model trained using an ArcFace technique, which is configured to compare face similarity or extract identifying features of a face. In some implementations, a "freezed" model is used.

In a second branch of the system flow 200 for training the non-facial content encoder 245, the image data 205 is pre-processed at block 240, such as by discarding superfluous data (e.g., facial content information). The pre-processed data is then received by the non-facial content encoder 245, and the non-facial content encoder 245 generates an embedding 250. The embedding 250 can comprise information regarding non-facial content (e.g., background, face pose, facial expression) and/or style (e.g., color and texture) of the image data 205, but the embedding 250 does not retain information about facial content of the image data 205. The style embedding 250 is provided to the residual bottleneck 235 for further processing. The non-facial content encoder 245 can be trained together with a decoder (e.g., decoder 255) as a whole model. The non-facial content encoder 245 is trained to compress an image into an embedding that can be used to reconstruct (e.g., using the decoder 255) all portions of an image other than a face identity. In other words, through the training of the whole model, the non-facial content encoder learns to generate an embedding that retains the information necessary to generate non-facial portions of an image, and this embedding can be combined with a facial embedding (e.g., received from the facial content encoder 215) to generate an image (e.g., output image 260). The whole model can be an autoencoder configured or trained to encode an input image into a compressed and meaningful representation, and then decode it back such that the reconstructed image is as similar as possible to the original one.

The residual bottleneck 235 and the decoder 255 include at least a portion of a ML model together combine and concatenate the embedding 220 and the embedding 250 to generate an output image 260. The output image 260 is then compared to the image data 205 to determine one or more loss functions indicating accuracy of the models included in the system flow 200 (e.g., 215, 245, 235, 255). Examples of loss functions include reconstruction loss, adversarial loss, identity loss, or the like. The loss functions indicate whether the models can accurately extract features (e.g., facial and non-facial content) of the image data 205 and reconstruct the image based on the extracted features. The system flow 200 can be repeated any number of times, and weights associated with the models can be adjusted (e.g., iteratively) until the trained models meet or exceed a threshold accuracy (e.g., 70%, 80%, 90%, 99%).

In some implementations, the system flow 200 is performed using image data 205 comprising batches of X images in which a portion (e.g., 10%, 20%, 50%) is not face swapped. In these and other implementations reconstruction loss is supported by an adversarial loss. For example, a reconstruction loss and an adversarial loss can be used to train a model to reconstruct an image and a face. For the remained or the image data in the batches, a reconstruction loss can be applied without using a face zone. As used herein, a reconstruction loss refers to a comparison between an original image and a result. In some implementations, a face-mask applied to the remaining images (i.e., the images that are face-swapped). As used herein, an adversarial loss refers to a loss used to train a generative adversarial networks.

In some implementations, a loss function can be generated using another ML model (e.g., a face detection model). For example, another ML model can be used to classify an image, such as to identify whether an image includes a face. This model can then be used to generate a loss function to determine whether outputs (e.g., output image 260) are close/similar to a face. A face detection model can be used to determine whether an output image 260 resembles a face without determining whether a specific face is depicted (e.g., whether the detected face is the same as in an input image).

In some implementations, a weighted combination of loss functions can be used. For example, a face detection model can be used in combination with other loss functions (e.g., adversarial loss determined based on a GAN, reconstruction loss, identity loss), and appropriate weights (e.g., for one or more models) based on the respective loss functions can be determined as part of the system flow 200. Training according to the system flow 200 consists of using a set of defined loss functions to determine the model weights that best fit the intended purpose.

Figure 3:
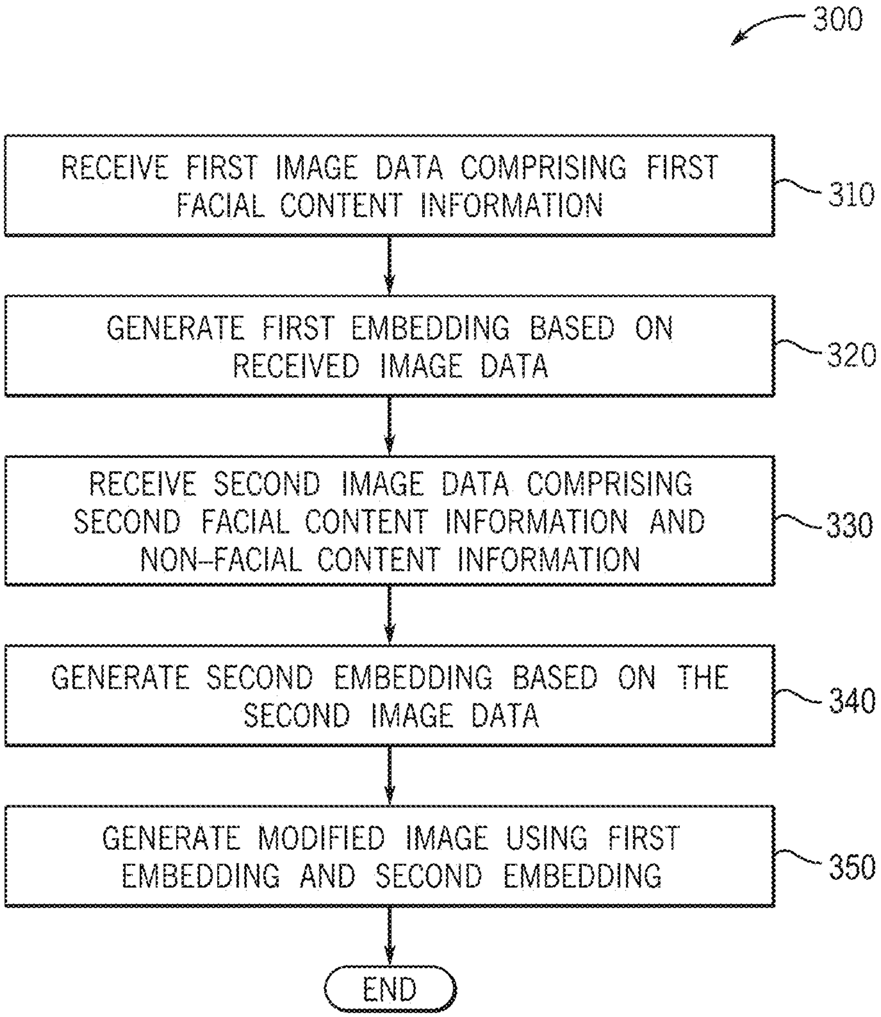
FIG. 3 is a flow diagram illustrating a process performed using a facial image swapping system.

FIG. 3 is a flow diagram illustrating a process 300 performed using facial image swapping system (e.g., system 105). The process 300 can be performed to generate modified images (e.g., 120 of FIG. 1) using facial content information and non-facial content information of different images (e.g., 110 and 115 of FIG. 1).

At block 310, first image data (e.g., 110 of FIG. 1) is received comprising first facial content information. The first image data can be a source image containing a face to be added to a destination image. The first facial content information can comprise information about facial features, such as shapes or dimensions of facial features (e.g., eyes, nose, mouth, eye brows). In some implementations, the first image data is pre-processed to extract the first facial content information, such as by cropping a face, aligning or rotating an image, applying a mask, or discarding superfluous data. For example, a portion of an image can be detected that includes a human face, and cropping is performed to extract only the detected portion of the image. The first image data received at block 310 comprises an image of a face that a user wishes to use to modify a different image (e.g., the destination image)—that is, the user can provide the image data at block 310 to indicate an original image of a face, which will be used to replace a face present in a different image.

At block 320, a first embedding is generated by an encoder using the first image data received at block 310. For example, the embedding can be generated to represent the first facial content information included in the first image data. The embedding can indicate, for example, shapes or dimensions of objects included in the received image data. The embedding is a representation of the facial content information in a dimensional space, such as a set of coordinates or a vector representation. The embedding preserves identifying information regarding facial content while discarding superfluous information, such as pose, facial expression, color, position, texture, or the like.

At block 330, second image data (e.g., 115 of FIG. 1) is received comprising second facial content information and non-facial content information. The second image data can be a destination image into which the facial information from the source image will be placed. The second image data is for a different image containing a different face. The second image data can be received for an image into which a user wishes to swap the face present in the first image data. The non-facial content information can include, for example, color information, style information, or content in the second image data other than the different face represented by the second facial content information. In other words, the non-facial content information can comprise all components of the second image data other than the face that will be swapped with the face present in the first image data. The non-facial content information further includes facial expression, face pose, positions and orientations of facial features, or the like.

At block 340, a second embedding is generated based on the second image data. The second embedding represents the non-facial content information in the second image data, and the second embedding does not contain the second facial content information (e.g., identifying information and/or facial features) because the second facial content information will be replaced by the first facial content information. The second embedding is generated using a non-facial content encoder (e.g., a style encoder).

At block 350, a modified image (e.g., 120 of FIG. 1) is generated using the first embedding and the second embedding. The modified image can be generated using a decoder. The modified image can be generated by concatenating the first embedding and the second embedding to generate an image having the first facial content information of the first image data received at block 310 and the non-facial content information represented in the second embedding generated at block 340.

In some implementations, the process 300 includes generating a training dataset and training a ML model comprising one or more encoders and one or more decoders (e.g., using the system flow 200 of FIG. 2).

In some implementations, the process 300 includes evaluating accuracy of a ML model, and retraining the ML model when the accuracy is below a threshold accuracy (e.g., 70%, 80%, 90%, 95%). Retraining the model can include adjusting one or more weights of the model and/or training the model at least a second time using a same training dataset or a different training dataset.

Operations can be added to or removed from the process 300 without deviating from the teachings of the present disclosure. One or more operations of the process 300 can be performed in any order, including performing operations in parallel, and the process 300 or portions thereof can be repeated any number of times.

In an example implementation, the process 300 is used to replace a face present in a second image (e.g., received at block 330) with a face present in a first image (e.g., received at block 310). Using the process 300, the non-facial content information (e.g., style information, content outside of a face, facial expression, face orientation or pose) from the second image can be retained, while the face in the second image is replaced with the face from the first image. The process 300 can swap faces even where substantial differences exist between the first image and the second image, such as different image styles, different facial features, different facial positions or orientations, different facial expressions, and so forth.

Figure 4:
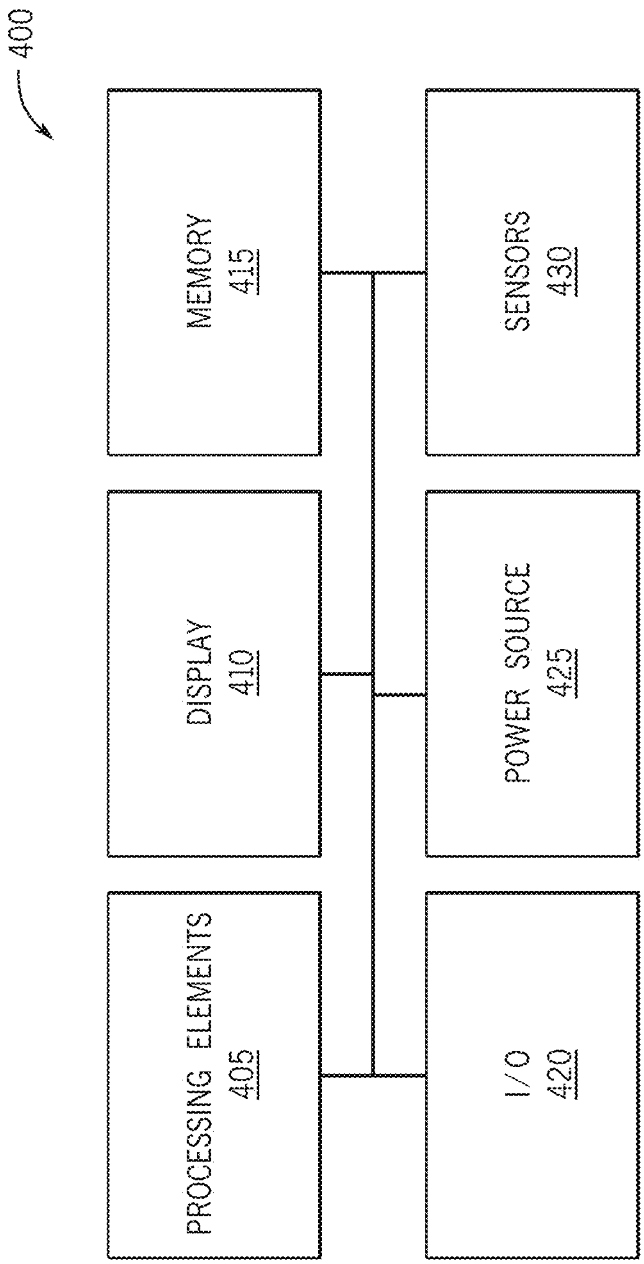
FIG. 4 is a block diagram illustrating a computing device for implementing a facial image swapping system.

FIG. 4 is a block diagram illustrating a computing device 400 for implementing a facial image swapping system (e.g., system 105). For example, at least a portion of the computing device 400 can comprise the system 105, or at least a portion of the system 105 can comprise the computing device 400.

The computing device 400 includes one or more processing elements 405, displays 410, memory 415, an input/output interface 420, power sources 425, and/or one or more sensors 430, each of which may be in communication either directly or indirectly.

The processing element 405 can be any type of electronic device and/or processor (e.g., processor 125) capable of processing, receiving, and/or transmitting instructions. For example, the processing element 405 can be a microprocessor or microcontroller. Additionally, it should be noted that select components of the system may be controlled by a first processor and other components may be controlled by a second processor, where the first and second processors may or may not be in communication with each other. The device 400 may use one or more processing elements 405 and/or may utilize processing elements included in other components.

The display 410 provides visual output to a user and optionally may receive user input (e.g., through a touch screen interface). The display 410 may be substantially any type of electronic display, including a liquid crystal display, organic liquid crystal display, and so on. The type and arrangement of the display depends on the desired visual information to be transmitted (e.g., can be incorporated into a wearable item such as glasses, or may be a television or large display, or a screen on a mobile device).

The memory 415 (e.g., memory/storage 135) stores data used by the device 400 to store instructions for the processing element 405, as well as store data for the facial image swapping system, such as models, received image data, modified images, and so forth. The memory 415 may be, for example, magneto-optical storage, read only memory, random access memory, erasable programmable memory, flash memory, or a combination of one or more types of memory components. The memory 415 can include, for example, one or more non-transitory computer-readable media carrying instructions configured to cause the processing element 405 and/or the device 400 or other components of the system to perform operations described herein.

The I/O interface 420 provides communication to and from the various devices within the device 400 and components of the computing resources to one another. The I/O interface 420 can include one or more input buttons, a communication interface, such as WiFi, Ethernet, or the like, as well as other communication components, such as universal serial bus (USB) cables, or the like. In some implementations, the I/O interface 420 can be configured to receive voice inputs and/or gesture inputs.

The power source 425 provides power to the various computing resources and/or devices. The facial image swapping system may include one or more power sources, and the types of power source may vary depending on the component receiving power. The power source 425 may include one or more batteries, wall outlet, cable cords (e.g., USB cord), or the like.

The sensors 430 may include sensors incorporated into the facial image swapping system. For example, the sensors 430 can include one or more cameras or other image capture devices for capturing images.

Components of the device 400 are illustrated only as examples, and illustrated components can be removed from and/or added to the device 400 without deviating from the teachings of the present disclosure. In some implementations, components of the device 400 can be included in multiple devices.

Components of the device 400 are illustrated only as examples, and illustrated components can be removed from and/or added to the device 400 without deviating from the teachings of the present disclosure. In some implementations, components of the device 400 can be included in multiple devices.

The disclosed systems and method advantageously allow efficient and accurate swapping of facial content information or other content from different images. For example, a face present in a first image can be easily extracted and seamlessly incorporated into a second image that previously contained a different face. Various embodiments allow face swapping in real time (e.g., in seconds or less), and facial content information can be swapped into an image even when the respective faces in the first and second images contain substantial differences, such as different proportions, different orientations, different features, different styles, and so forth.

The technology described herein can be implemented as logical operations and/or modules in one or more systems. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations can be performed in any order, unless explicitly claimed otherwise or unless a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology can be employed in special-purpose devices independent of a personal computer.

The above specification, examples and data provide a complete description of the structure and use of example embodiments as defined in the claims. Although various example embodiments are described above, other embodiments using different combinations of elements and structures disclosed herein are contemplated, as other implementations can be determined through ordinary skill based upon the teachings of the present disclosure. It is intended that all matter contained in the above description and shown in the accompanying drawings shall be interpreted as illustrative only of particular embodiments and not limiting. Changes in detail or structure can be made without departing from the basic elements as defined in the following claims.

What is claimed is:

1. A computing system comprising:

at least one processor; and at least one non-transitory memory carrying instructions that, when executed by the at least one processor, cause the computing system to perform operations comprising:

receive first image data comprising first facial content information;

generate, using a facial content encoder, a facial content embedding comprising the first facial content information, wherein the facial content encoder extracts the first facial content information from the first image data to generate the facial content embedding;

receive second image data comprising second facial content information and non-facial content information;

generate, using a non-facial content encoder, a non-facial content embedding comprising the non-facial content information;

generate, by a decoder, a modified image using the facial content embedding and the non-facial content embedding, wherein the modified image comprises the first facial content information of the first image data and the non-facial content information of the second image data.

2. The computing system of claim 1, wherein the first facial content information comprises shapes or dimensions of a set of facial features in the first image data.

3. The computing system of claim 1, wherein the non-facial content information comprises style information of the second image data, background information of the second image data, and a facial pose or facial expression of the second facial content, and wherein the style information comprises color information and texture information.

4. The computing system of claim 3, wherein the style information is associated with an animation style or an artistic style or technique.

5. The computing system of claim 1, wherein the facial content encoder, the non-facial content encoder, and the decoder are included in a machine-learned (ML) model, and wherein the operations further comprise:

receive a plurality of image data comprising a plurality of facial content information and a plurality of non-facial content information;

generate a training dataset using the received plurality of image data, wherein the received plurality of image data is pre-processed by cropping and aligning the plurality of facial content information; and train the ML model using the generated training dataset, wherein the training comprises determining a set of loss functions and corresponding weights based on the loss functions.

6. The computing system of claim 5, wherein the operations further comprise:

evaluate accuracy of the ML model using a testing dataset comprising at least a portion of the training dataset; and retrain the ML model when the accuracy does not exceed a threshold accuracy, wherein the retraining comprises adjusting a set of weights or training the ML model using a different training dataset.

7. A non-transitory computer-readable medium carrying instructions that, when executed by a computing system, cause the computing system to perform operations comprising:

receive first image data comprising first facial content information;

generate, using a facial content encoder, a facial content embedding comprising the first facial content information, wherein the facial content encoder extracts the first facial content information from the first image data to generate the facial content embedding;

receive second image data comprising second facial content information and non-facial content information;

generate, using a non-facial content encoder, a non-facial content embedding comprising the non-facial content information;

generate, by a decoder, a modified image using the facial content embedding and the non-facial content embedding, wherein the modified image comprises the first facial content information of the first image data and the non-facial content information of the second image data.

8. The non-transitory computer-readable medium of claim 7, wherein the first facial content information comprises shapes or dimensions of a set of facial features in the first image data.

9. The non-transitory computer-readable medium of claim 7, wherein the non-facial content information comprises style information of the second image data, background information of the second image data, and a facial pose or facial expression of the second facial content information, and wherein the style information comprises color information and texture information.

10. The non-transitory computer-readable medium of claim 9, wherein the style information is associated with an animation style or an artistic style or technique.

11. The non-transitory computer-readable medium of claim 7, wherein the facial content encoder, the non-facial content encoder, and the decoder are included in a machine-learned (ML) model.

12. The non-transitory computer-readable medium of claim 11, further comprising:

receive a plurality of image data comprising a plurality of facial content information and a plurality of non-facial content information;

generate a training dataset using the received plurality of image data, wherein the received plurality of image data is pre-processed by cropping and aligning the plurality of facial content information; and train the ML model using the generated training dataset, wherein the training comprises determining a set of loss functions and corresponding weights based on the loss functions.

13. The non-transitory computer-readable medium of claim 12, further comprising:

evaluate accuracy of the ML model using a testing dataset comprising at least a portion of the training dataset; and retrain the ML model when the accuracy does not exceed a threshold accuracy, wherein the retraining comprises adjusting a set of weights or training the ML model using a different training dataset.

14. A computer-implemented method of generating modified images using facial content information, the method comprising:

receiving first image data comprising first facial content information;

generating, using a facial content encoder, a first embedding comprising the first facial content information, wherein the facial content encoder extracts the first facial content information from the first image data to generate the first embedding;

receiving second image data comprising second facial content information and non-facial content information;

generating, using a non-facial content encoder, a second embedding comprising the non-facial content information;

generating, by a decoder, a modified image using the first embedding and the second embedding, wherein the modified image comprises the first facial content information of the first image data and the non-facial content information of the second image data.

15. The computer-implemented method of claim 14, wherein the first facial content information comprises shapes or dimensions of a set of facial features in the first image data.

16. The computer-implemented method of claim 14, wherein the non-facial content information comprises style information of the second image data, background information of the second image data, and a facial pose or facial expression of the second facial content, and wherein the style information comprises color information and texture information.

17. The computer-implemented method of claim 16, wherein the style information is associated with an animation style or an artistic style or technique.

18. The computer-implemented method of claim 14, wherein the facial content encoder, the non-facial content encoder, and the decoder are included in a machine-learned (ML) model.

19. The computer-implemented method of claim 18, further comprising:

receiving a plurality of image data comprising a plurality of facial content information and a plurality of non-facial content information;

generating a training dataset using the received plurality of image data, wherein the received plurality of image data is pre-processed by cropping and aligning the plurality of facial content information; and training the ML model using the generated training dataset, wherein the training comprises determining a set of loss functions and corresponding weights based on the loss functions.

20. The computer-implemented method of claim 19, further comprising:

evaluating accuracy of the ML model using a testing dataset comprising at least a portion of the training dataset; and retraining the ML model when the accuracy does not exceed a threshold accuracy, wherein the retraining comprises adjusting a set of weights or training the ML model using a different training dataset.

* * * * *